(12) United States Patent
Abe et al.

(10) Patent No.: US 7,537,861 B2
(45) Date of Patent: May 26, 2009

(54) LITHIUM SECONDARY BATTERY EMPLOYING FLUORINE-SUBSTITUTED CYCLOHEXYLBENZENE CONTAINING ELECTROLYTIC SOLUTION

(75) Inventors: Koji Abe, Yamaguchi (JP); Takashi Hattori, Yamaguchi (JP); Takaaki Kuwata, Yamaguchi (JP); Yasuo Matsumori, Yamaguchi (JP)

(73) Assignee: UBE Industries, Ltd., Ube-Shi, Yamaguchi (JP)

( * ) Notice: Subject to any disclaimer, the term of this patent is extended or adjusted under 35 U.S.C. 154(b) by 884 days.

(21) Appl. No.: 10/521,797

(22) PCT Filed: Jul. 31, 2003

(86) PCT No.: PCT/JP03/09739

§ 371 (c)(1),
(2), (4) Date: Jan. 21, 2005

(87) PCT Pub. No.: WO2004/012295

PCT Pub. Date: Feb. 5, 2004

(65) Prior Publication Data

US 2005/0250007 A1    Nov. 10, 2005

(30) Foreign Application Priority Data

Jul. 31, 2002    (JP)    ............................... 2002-222510

(51) Int. Cl.
*H01M 10/40*    (2006.01)
(52) U.S. Cl. .................. 429/199; 429/200; 429/326; 429/330; 429/331
(58) Field of Classification Search .................. None
See application file for complete search history.

(56) References Cited

U.S. PATENT DOCUMENTS 5,709,968 A * 1/1998 Shimizu .................... 429/324
2002/0192565 A1* 12/2002 Ueda et al. .................. 429/331

FOREIGN PATENT DOCUMENTS

| EP | 746050 A1 | 12/1996 |
| EP | 1213782 A2 | 6/2002 |
| JP | 6-275271 A | 9/1994 |
| JP | 10-74537 A | 3/1998 |
| JP | 10-112335 A | 4/1998 |
| JP | 10-275632 A | 10/1998 |
| JP | 2002-25612 | 1/2002 |
| JP | 2002-50398 A | 2/2002 |
| JP | 2003-132949 | * 5/2003 |

OTHER PUBLICATIONS

MatWeb Datasheet for TIMCAL TIMREX KS6 Primary Synthetic Graphite.*
International Preliminary Examination Report (Form PCT/IPEA/409).

* cited by examiner

*Primary Examiner*—Jonathan Crepeau
*Assistant Examiner*—Tony Chuo
(74) *Attorney, Agent, or Firm*—Nixon Peabody LLP; Jeffrey L. Costellia

(57) ABSTRACT

A lithium secondary battery comprising a positive electrode, a negative electrode of artificial graphite or natural graphite and a nonaqueous electrolytic solution having an electrolyte dissolved in a nonaqueous solvent, wherein 0.1 to 20 wt. % of a cyclohexylbenzene having a halogen atom bonded to a benzene ring thereof is contained in the nonaqueous electrolytic solution exhibits large electric capacity and excellent cycle performance.

7 Claims, No Drawings

LITHIUM SECONDARY BATTERY EMPLOYING FLUORINE-SUBSTITUTED CYCLOHEXYLBENZENE CONTAINING ELECTROLYTIC SOLUTION

FIELD OF INVENTION

The present invention relates to a lithium secondary battery having excellent battery characteristics in cycle performance, electric capacity and storage property.

BACKGROUND OF INVENTION

Recently, a lithium secondary battery is generally employed as an electric source for driving small electronic devices. The lithium secondary battery essentially comprises a positive electrode, a nonaqueous electrolytic solution, and a negative electrode. A lithium secondary battery utilizing a positive electrode of lithium compound oxide such as $LiCoO_2$ and a negative electrode of carbonaceous material or lithium metal is favorably used. As the electrolytic solution for the lithium secondary battery, a carbonate such as ethylene carbonate (EC) or propylene carbonate (PC) is favorably used.

Nevertheless, it is desired to provide a secondary battery showing improved characteristics in the cycle performance and electric capacity.

A lithium secondary battery utilizing a positive electrode of $LiCoO_2$, $LiMn_2O_4$ or $LiNiO_2$ sometimes shows decrease of electric performances because a portion of the nonaqueous solvent in the nonaqueous electrolytic solution oxidatively decomposes in the course of charging and hence the produced decomposition product disturbs the desired electrochemical reaction. The decomposition is considered to be caused by electrochemical oxidation of the solvent on the interface between the positive electrode and the nonaqueous electrolytic solution.

On the other hand, a lithium secondary battery utilizing a negative electrode of carbonaceous material of high crystallization such as natural graphite or artificial graphite also shows decrease of electric performances because a solvent of the electrolytic solution reductively decomposes on the surface of the negative electrode in the course of charging. The reductive decomposition also occurs in the repeated charging-discharging procedures when EC (which is generally employed as the nonaqueous solvent of the electrolytic solution) is utilized as the nonaqueous solvent.

Japanese Patent Provisional Publication 10-74537 describes that the cycle performance and electric capacity are improved when a small amount of an aromatic compound such as benzene having a hydrocarbon substituent (e.g., cyclohexylbenzene).

Japanese Patent Provisional Publication 10-112335 describes that the cycle performance is improved when a small amount of a fluorine atom-containing aromatic compound such as fluorobenzene is added to a nonaqueous electrolytic solution of a lithium secondary battery.

DISCLOSURE OF INVENTION

The present invention has an object to provide a lithium secondary battery showing improved battery cycle performance, improved electric capacity, and improved storability in the charged condition.

The present invention resides in a lithium secondary battery comprising a positive electrode, a negative electrode of artificial graphite or natural graphite and a nonaqueous electrolytic solution having an electrolyte dissolved in a nonaqueous solvent, wherein 0.1 to 20 wt. % of a cyclohexylbenzene having a halogen atom bonded to a benzene ring thereof is contained in the nonaqueous electrolytic solution.

The cyclohexylbenzene having a halogen atom bonded to a benzene ring thereof employed in the invention preferably is a compound having the following formula (I):

wherein X is a halogen atom, and the halogen atom is attached to an optional position.

Preferred is 1-halogeno-4-cyclohexylbenzene.

DETAILED EXPLANATION OF THE INVENTION

In the cyclohexylbenzene having a halogen atom bonded to a benzene ring thereof (hereinafter referred to as "cyclohexyl-halogenobenzene") contained in the nonaqueous electrolytic solution containing an electrolyte dissolved in a nonaqueous solvent, the halogen atom preferably is a fluorine atom or a chlorine atom.

Examples of the cyclohexyl-halogenobenzenes include 1-fluoro-2-cyclohexylbenzene, 1-fluoro-3-cyclohexylbenzene, 1-fluoro-4-cyclohexylbenzene, 1-chloro-4-cyclohexylbenzene, 1-bromo-4-cyclohexylbenzene, and 1-iodo-4-cyclohexylbenzene.

If the content of the cyclohexyl-halogenobenzene in the nonaqueous electrolytic solution is extremely large, the battery performances may lower. If the content of the cyclohexyl-halogenobenzene is extremely small, an expected improvement of the battery performances cannot be attained. Accordingly, the content preferably is in the range of 0.1-20 wt. %, more preferably 0.2-10 wt. %, most preferably 0.5-5 wt. %, based on the amount of the nonaqueous electrolytic solution, so that the cycle performance can well improved.

Examples of the non-aqueous solvents employed in the electrolytic solution of the invention are cyclic carbonates such as ethylene carbonate (EC), propylene carbonate (PC), butylene carbonate (BC), and vinylene carbonate (VC), lactones such as γ-butyrolactone, linear carbonates such as dimethyl carbonate (DMC), methyl ethyl carbonate (MEC), and diethyl carbonate (DEC), ethers such as tetrahydrofuran, 2-methyltetrahydrofuran, 1,4-dioxane, 1,2-dimethoxyethane, 1,2-diethoxyethane, and 1,2-dibutoxyethane, nitriles such as acetonitrile and adiponitrile, esters such as methyl propionate, methyl pivalate, butyl pivalate, octyl pivalate and dimethyl oxalate, amides such as dimethylformamide, and compounds containing S=O group such as 1,3-propanesultone, glycol sulfite and divinyl sulfone.

The non-aqueous solvents can be employed singly or in combination of two or more. There are no specific limitations with respect to the combination of the non-aqueous solvents. Examples of the combinations include a combination of a cyclic carbonate and a linear carbonate, a combination of a cyclic carbonate and a lactone, and a combination of plural cyclic carbonates and linear carbonates.

Examples of the electrolytes employed in the invention include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. These electrolytes can be employed singly or in combination of two or more. The electrolyte can be incorporated into the non-aqueous solvent generally in such an amount as to give an electrolytic solution of 0.1 M to 3 M, preferably 0.5 M to 1.5 M.

The electrolytic solution of the invention can be prepared, for instance, by mixing the above-mentioned non-aqueous solvents; dissolving the above-mentioned electrolyte in the mixture; and further dissolving at least one of the above-mentioned cyclohexyl-halogenobenzenes in the resulting mixture.

For instance, the active material of positive electrode is a compound metal oxide comprising lithium and cobalt or nickel. The active material of positive electrode can be used singly or in combination. Examples of the compound metal oxides include $LiCoO_2$, $LiNiO_2$, and $LiCo_{1-x}Ni_xO_2$ (0.10<x<1). These compounds can be employed in an optional combination such as a combination of $LiCoO_2$ and $LiMn_2O_4$, a combination of $LiCoO_2$ and $LiNiO_2$, and a combination of $LiMn_2O_4$ and $LiNiO_2$.

The positive electrode can be manufactured by kneading the above-mentioned active material of positive electrode, an electro-conductive material such as acetylene black or carbon black, and a binder such as poly(tetrafluoroethylene) (PTFE) or poly(vinylidene fluoride) (PVDF), to give a positive electrode composition; coating the positive electrode composition on a collector such as aluminum foil or a lath plate of stainless steel; drying and pressing the coated composition, and heating the pressed composition in vacuo at a temperature of approximately 50 to 250° C. for approximately 2 hours.

As the active material of negative electrode, carbonaceous material capable of absorbing and releasing lithium (such as artificial graphite and natural graphite). It is preferred to employ artificial graphite and natural graphite having a graphite crystal structure in which the lattice distance of lattice surface (002), namely, $d_{002}$, is in the range of 0.335 to 0.340 nm (nanometer). The active materials of negative electrode can be employed singly or in combination. A powdery material such as the carbonaceous material is preferably used in combination with a binder such as ethylene propylene diene terpolymer (EPDM), poly(tetrafluoroethylene) (PTFE) or poly(vinylidene fluoride) (PVDF). There are no limitations with respect to the preparing method of the negative electrode. The negative electrode can be prepared by a method similar to that for the preparation of the positive electrode.

There are no specific limitations with respect to the structure of the nonaqueous lithium secondary battery of the invention. For instance, the nonaqueous secondary battery can be a battery of coin type comprising a positive electrode, a negative electrode, and single or plural separators, or a cylindrical or prismatic battery comprising a positive electrode, a negative electrode, and a separator roll. The separator can be a known material such as micro-porous polyolefin film, woven cloth, or non-woven cloth.

The lithium secondary battery of the invention exhibits excellent cycle performance even when it is employed under the charging condition of a high terminal voltage of higher than 4.2 V, particularly approximately 4.3 V. The discharge terminal voltage can be 2.5 V or higher, moreover 2.8 V or higher. There are no specific limitation with respect to the current value, and a constant current of 0.1 to 3 C is generally adopted for discharge. The lithium secondary battery of the invention can be charged and discharged within a wide temperature range such as −40 to 100° C., but preferably 0 to 80° C.

The lithium secondary battery of the invention may have a safety valve at the sealing plate to obviate increase of the inner pressure. Otherwise, a notch can be provided to the battery case or gasket. Also employable are one or more of known safety elements such as a fuse, a bimetal element, and a PTC element, each of which serves as an element for obviating overcurrent.

If desired, the lithium secondary battery of the invention can be encased in a battery pack in which plural batteries are arranged in series and/or in parallel. The battery pack can have a safety element such as a PTC element, a thermostatic fuse, a fuse and/or an electric current breaker, and further a safety circuit (i.e., a circuit capable of monitoring the voltage, temperature and current of the battery of combined battery, and then breaking the current).

EXAMPLE 1

[Preparation of Non-Aqueous Electrolytic Solution]

In a nonaqueous solvent of EC:DEC (=3:7, volume ratio) was dissolved 1M of $LiPF_6$ to give a nonaqueous electrolytic solution. To the nonaqueous electrolytic solution was further added 2.0 wt. % of 1-fluoro-4-cyclohexylbenzene.

[Manufacture of Lithium Secondary Battery and Measurement of its Battery Performances]

$LiCoO_2$ (positive electrode active material, 80 wt. %), acetylene black (electro-conductive material, 10 wt. %), and poly(vinylidene fluoride) (binder, 10 wt. %) were mixed. To the resulting mixture was further added 1-methyl-2-pyrrolidone. Thus produced mixture was coated on aluminum foil, dried, pressed, and heated to give a positive electrode.

Artificial graphite (negative electrode active material, 90 wt. %) and poly(vinylidene fluoride) (binder, 10 wt. %) were mixed. To the resulting mixture was further added 1-methyl-2-pyrrolidone. Thus produced mixture was coated on copper foil, dried, pressed, and heated to give a negative electrode.

The positive and negative electrodes, a microporous polypropylene film separator, and the above-mentioned nonaqueous electrolytic solution were employed to give a coin-type battery (diameter: 20 mm, thickness: 3.2 mm).

The coin-type battery was charged at room temperature (20° C.) with a constant electric current (0.8 mA) to reach 4.2 V (terminal voltage) for 5 hours. Subsequently, the battery was discharged to give a constant electric current (0.8 mA) to give a terminal voltage of 2.7 V. The charging-discharging cycle procedure was repeated.

The initial charge-discharge capacity was almost the same as the capacity measured in a battery using an 1M $LiPF_6$ and EC/DEC (3/7, volume ratio) solvent mixture (containing no additive) [see Comparison Example 1].

After the 50 cycle charging-discharging procedure, the retention of discharge capacity was 92.9% of the initial discharge capacity (100%). The low temperature performances are also good.

The conditions for manufacturing the coin-type battery and the battery performances are shown in Table 1.

EXAMPLE 2

The procedures of Example 1 for preparing a nonaqueous electrolytic solution and manufacturing a coin-type battery were repeated except for using 5.0 wt. % of 1-fluoro-4-cyclohexylbenzene.

After the 50 cycle charging-discharging procedure, the retention of discharge capacity was 91.4%.

The conditions for manufacturing the coin-type battery and the battery performances are shown in Table 1.

EXAMPLE 3

The procedures of Example 1 for preparing a nonaqueous electrolytic solution and manufacturing a coin-type battery were repeated except for using 0.5 wt. % of 1-fluoro-4-cyclohexylbenzene.

After the 50 cycle charging-discharging procedure, the retention of discharge capacity was 90.5%.

The conditions for manufacturing the coin-type battery and the battery performances are shown in Table 1.

COMPARISON EXAMPLE 1

In a non-aqueous solvent of EC:DEC (=3:7, volume ratio) was dissolved 1 M of $LiPF_6$ to give a nonaqueous electrolytic solution. To the nonaqueous electrolytic solution was added no cyclohexylbenzene compound.

Then, a coin-type battery was manufactured by employing the resulting nonaqueous electrolytic solution.

After the 50 cycle charging-discharging procedure, the retention of discharge capacity was 82.6% of the initial discharge capacity.

The conditions for manufacturing the coin-type battery and the battery performances are shown in Table 1.

EXAMPLE 4

The procedures of Example 1 for preparing a nonaqueous electrolytic solution and manufacturing a coin-type battery were repeated except for using 2.0 wt. % of 1-fluoro-2-cyclohexylbenzene.

After the 50 cycle charging-discharging procedure, the retention of discharge capacity was 92.4%.

The conditions for manufacturing the coin-type battery and the battery performances are shown in Table 1.

EXAMPLE 5

The procedures of Example 1 for preparing a nonaqueous electrolytic solution and manufacturing a coin-type battery were repeated except for using 2.0 wt. % of 1-fluoro-3-cyclohexylbenzene.

After the 50 cycle charging-discharging procedure, the retention of discharge capacity was 92.0%.

The conditions for manufacturing the coin-type battery and the battery performances are shown in Table 1.

EXAMPLE 6

The procedures of Example 1 for preparing a nonaqueous electrolytic solution and manufacturing a coin-type battery were repeated except for using 2.0 wt. % of 1-chloro-4-cyclohexylbenzene.

After the 50 cycle charging-discharging procedure, the retention of discharge capacity was 89.1%.

The conditions for manufacturing the coin-type battery and the battery performances are shown in Table 1.

EXAMPLE 7

The procedures of Example 1 for preparing a nonaqueous electrolytic solution and manufacturing a coin-type battery were repeated except for using 2.0 wt. % of 1-bromo-4-cyclohexylbenzene.

After the 50 cycle charging-discharging procedure, the retention of discharge capacity was 88.9%.

The conditions for manufacturing the coin-type battery and the battery performances are shown in Table 1.

COMPARISON EXAMPLE 2

The procedures of Example 1 for preparing a nonaqueous electrolytic solution and manufacturing a coin-type battery were repeated except for using 5.0 wt. % of fluorobenzene.

After the 50 cycle charging-discharging procedure, the retention of discharge capacity was 82.9%.

The conditions for manufacturing the coin-type battery and the battery performances are shown in Table 1.

COMPARISON EXAMPLE 3

The procedures of Example 1 for preparing a nonaqueous electrolytic solution and manufacturing a coin-type battery were repeated except for using 5.0 wt. % of cyclohexylbenzene.

After the 50 cycle charging-discharging procedure, the retention of discharge capacity was 83.1%.

The conditions for manufacturing the coin-type battery and the battery performances are shown in Table 1.

EXAMPLE 8

The procedures of Example 1 for manufacturing a coin-type battery were repeated except for replacing the artificial graphite (i.e., active material of the negative electrode) with natural graphite.

After the 50 cycle charging-discharging procedure, the retention of discharge capacity was 92.6%.

The conditions for manufacturing the coin-type battery and the battery performances are shown in Table 1.

EXAMPLE 9

The procedures of Example 1 for manufacturing a coin-type battery were repeated except for replacing the $LiCoO_2$ (i.e., active material of the positive electrode) with $LiNi_{0.8}Co_{0.2}O_2$.

After the 50 cycle charging-discharging procedure, the retention of discharge capacity was 91.0%.

The conditions for manufacturing the coin-type battery and the battery performances are shown in Table 1.

EXAMPLE 10

The procedures of Example 1 for manufacturing a coin-type battery were repeated except for replacing the $LiCoO_2$ (i.e., active material of the positive electrode) with $LiMn_2O_4$.

After the 50 cycle charging-discharging procedure, the retention of discharge capacity was 92.4%.

The conditions for manufacturing the coin-type battery and the battery performances are shown in Table 1.

TABLE 1

| Example | Electrode Posi. Nega. | Additive (amount: wt. %) | Electrolytic solution | Initial capacity (r.v.) | 50% cycle retention (%) |
|---|---|---|---|---|---|
| 1 | $LiCoO_2$ / Art. | 1-fluoro-4-cyclohexyl-benzene (2.0) | 1M $LiPF_6$ EC/DEC = 3/7 | 1.02 | 92.9 |
| 2 | $LiCoO_2$ / Art. | 1-fluoro-4-cyclohexyl-benzene (5.0) | 1M $LiPF_6$ EC/DEC = 3/7 | 1.01 | 91.4 |
| 3 | $LiCoO_2$ / Art. | 1-fluoro-4-cyclohexyl-benzene (0.5) | 1M $LiPF_6$ EC/DEC = 3/7 | 1.01 | 90.5 |
| Com. 1 | $LiCoO_2$ / Art. | None | 1M $LiPF_6$ EC/DEC = 3/7 | 1.00 | 82.6 |
| 4 | $LiCoO_2$ / Art. | 1-fluoro-2-cyclohexyl-benzene (2.0) | 1M $LiPF_6$ EC/DEC = 3/7 | 1.02 | 92.4 |
| 5 | $LiCoO_2$ / Art. | 1-fluoro-3-cyclohexyl-benzene (2.0) | 1M $LiPF_6$ EC/DEC = 3/7 | 1.02 | 92.0 |
| 6 | $LiCoO_2$ / Art. | 1-chloro-4-cyclohexyl-benzene (2.0) | 1M $LiPF_6$ EC/DEC = 3/7 | 1.01 | 89.1 |
| 7 | $LiCoO_2$ / Art. | 1-bromo-4-cyclohexyl-benzene (2.0) | 1M $LiPF_6$ EC/DEC = 3/7 | 1.01 | 88.9 |
| Com. 2 | $LiCoO_2$ / Art. | fluoro-benzene (5.0) | 1M $LiPF_6$ EC/DEC = 3/7 | 0.99 | 82.9 |
| Com. 3 | $LiCoO_2$ / Art. | cyclohexyl-benzene (5.0) | 1M $LiPF_6$ EC/DEC = 3/7 | 0.99 | 83.1 |
| 8 | $LiCoO_2$ / Nat. | 1-fluoro-4-cyclohexyl-benzene (2.0) | 1M $LiPF_6$ EC/DEC = 3/7 | 1.02 | 92.6 |
| 9 | $LiNi_{0.8}Co_{0.2}O_2$ / Art. | 1-fluoro-4-cyclohexyl-benzene (2.0) | 1M $LiPF_6$ EC/DEC = 3/7 | 1.14 | 91.0 |
| 10 | $LiMn_2O_4$ / Art. | 1-fluoro-4-cyclohexyl-benzene (2.0) | 1M $LiPF_6$ EC/DEC = 3/7 | 0.99 | 92.4 |

INDUSTRIAL UTILITY

The present invention provides a lithium secondary battery having excellent battery performances in the cycle performance, electric capacity, and storage performance.

What is claimed is:

1. A lithium secondary battery comprising a positive electrode, a negative electrode of artificial graphite or natural graphite and a nonaqueous electrolytic solution having an electrolyte dissolved in a nonaqueous solvent, wherein 0.2 to 10 wt. % of a cyclohexylbenzene having a flourine atom bonded to a benzene ring thereof is contained in the nonaqueous electrolytic solution.

2. The lithium secondary battery of claim 1, wherein the cyclohexylbenzene having a flourine atom bonded to a benzene ring thereof is a compound having the following formula (I):

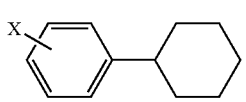

(I)

wherein X is a flourine atom, and the flourine atom is attached to an optional position.

3. The lithium secondary battery of claim 2, wherein the cyclohexylbenzene having a flourine atom bonded to a benzene ring thereof is 1-flourine-4-cyclohexylbenzene.

4. The lithium secondary battery of claim 1, wherein the cyclohexylbenzene having a flourine atom bonded to a benzene ring thereof is contained in the nonaqueous electrolytic solution in an amount of 0.5 to 5 wt. %.

5. The lithium secondary battery of claim 1, wherein the nonaqueous solvent of the nonaqueous electrolytic solution comprises a combination of a cyclic carbonate and a linear carbonate, a combination of a cyclic carbonate and lactone, or a combination of plural cyclic carbonates and linear carbonates.

6. The lithium secondary battery of claim 1, which contains vinylene carbonate.

7. The lithium secondary battery of claim 1, wherein the artificial graphite or natural graphite has a graphite crystal structure having a lattice distance in terms of $d_{002}$ of lattice surface (002) in the range of 0.335 to 0.340 nm.

* * * * *